United States Patent [19]

Hanson

[11] 4,239,433
[45] Dec. 16, 1980

[54] PALLETIZER WITH ROLLER-ASSISTED OFF-FEED DEVICE

[75] Inventor: Edward W. Hanson, Anaheim, Calif.

[73] Assignee: Columbia Machine, Inc., Vancouver, Wash.

[21] Appl. No.: 931,435

[22] Filed: Aug. 8, 1978

[51] Int. Cl.³ .............................................. B65G 57/03
[52] U.S. Cl. ..................................... 414/84; 198/422;
414/85; 414/90
[58] Field of Search ...................... 414/35, 40, 43, 50,
414/54, 56, 57, 76, 77, 82, 84, 85, 86, 87, 88, 90,
91; 198/422

[56] References Cited

U.S. PATENT DOCUMENTS

| | | | |
|---|---|---|---|
| 3,912,253 | 10/1975 | Jarman | 414/76 X |
| 4,030,620 | 6/1977 | Euverard et al. | 414/77 X |
| 4,067,456 | 1/1978 | Schmitt | 414/84 X |

Primary Examiner—Frank E. Werner

Attorney, Agent, or Firm—Kolisch, Hartwell & Dickinson

[57] ABSTRACT

A roller-assisted off-feed device for use on a palletizer. The palletizer includes a stacking platform and a carriage mounted for horizontal shifting between an extended position overlying the platform and a retracted position spaced therefrom. The surface of the carriage is formed of a plurality of article-support rollers mounted for rotation about substantially horizontal axes extending transversely of the path of travel of the carriage. The off-feed device includes an elongate contacting element overlying the stacking platform and extending horizontally along the path of travel of the carriage. The element is vertically positionable between raised and lowered positions, with the element in the latter position being contactable with carriage rollers positioned above the stacking platform to cause such rollers to rotate to off-load articles from the carriage as the carriage is moved from its extended to its retracted position.

2 Claims, 5 Drawing Figures

PALLETIZER WITH ROLLER-ASSISTED OFF-FEED DEVICE

BACKGROUND AND SUMMARY

The following invention relates to palletizers, and in particular, to a roller-assisted off-feed device for use thereon.

In U.S. Pat. No. 4,067,456 to Schmitt there is disclosed apparatus for arranging and stacking non-rigid articles, such as bags or the like. The apparatus disclosed therein includes a layer-arranging table, a stacking platform, and a roller carriage horizontally shiftable between a retracted position horizontally adjacent the layer-arranging table and an extended position overlying the stacking platform. The carriage surface is formed of a plurality of article-support rollers mounted for rotation about axes extending transversely of the path of travel of the carriage. The carriage serves to transfer a layer of articles from the layer-arranging table to the stacking platform, where the layers are stacked on a pallet. A fence vertically shiftable to an article-engaging position adjacent the stacking platform is operable to engage upstream edges of articles on the carriage, with the latter in its extended position. As the carriage is shifted from its extended to its retracted position, the fence retains the articles at a position above the stacking platform, wiping articles from the carriage onto the stacking platform.

From the above, it may be appreciated that the fence must exert a considerable force against the upstream edges of the articles in wiping articles from the roller carriage. This may produce two untoward effects. First, the articles to be palletized are commonly filled bags, such as bags of cement or the like, and these tend to be torn or otherwise damaged during the wiping operation. Second, bag articles are generally arranged on the carriage in upstream and downstream rows, so that the force of the fence is directed against the upstream row, and transmitted therefrom to the downstream row. In the wiping operation, the upstream row tends to be squeezed between the fence and the downstream row, disturbing the configuration of articles on the carriage as they are off-loaded.

One important object of the present invention is to provide an off-feed device, for use on the above-described type of bag palletizer, wherein the rollers of the carriage are caused to rotate in such direction to facilitate off-loading of articles from the carriage as the carriage is retracted and articles are transferred therefrom onto a stacking platform.

Yet another object of the invention is to provide such device which may be easily installed on existing palletizers of the above-described type, and which is easily operated.

The present invention in roller-assisted off-feed device is designed for use with the above-described palletizer and generally includes a vertically-shiftable contacting element overlying the stacking platform and extending horizontally in the direction of the path of travel of the palletizer roller carriage. With the carriage shifted to its extended position overlying the stacking platform, the contacting member is shifted from a raised to a lowered position wherein the element frictionally contacts the carriage rollers, preventing free rotation thereof. Shifting of the carriage toward its retracted position causes the rollers to rotate in a direction which advances articles in the direction opposite that of carriage movement, facilitating the off-loading of articles onto the stacking platform.

Other objects and features of the present invention will become more fully apparent from the following description of the invention and the accompanying drawings.

DRAWINGS

FIG. 3 is an enlarged sectional view taken generally along line 3—3 in FIG. 2.

DETAILED DESCRIPTION OF A PREFERRED EMBODIMENT OF THE INVENTION

Figure 1:
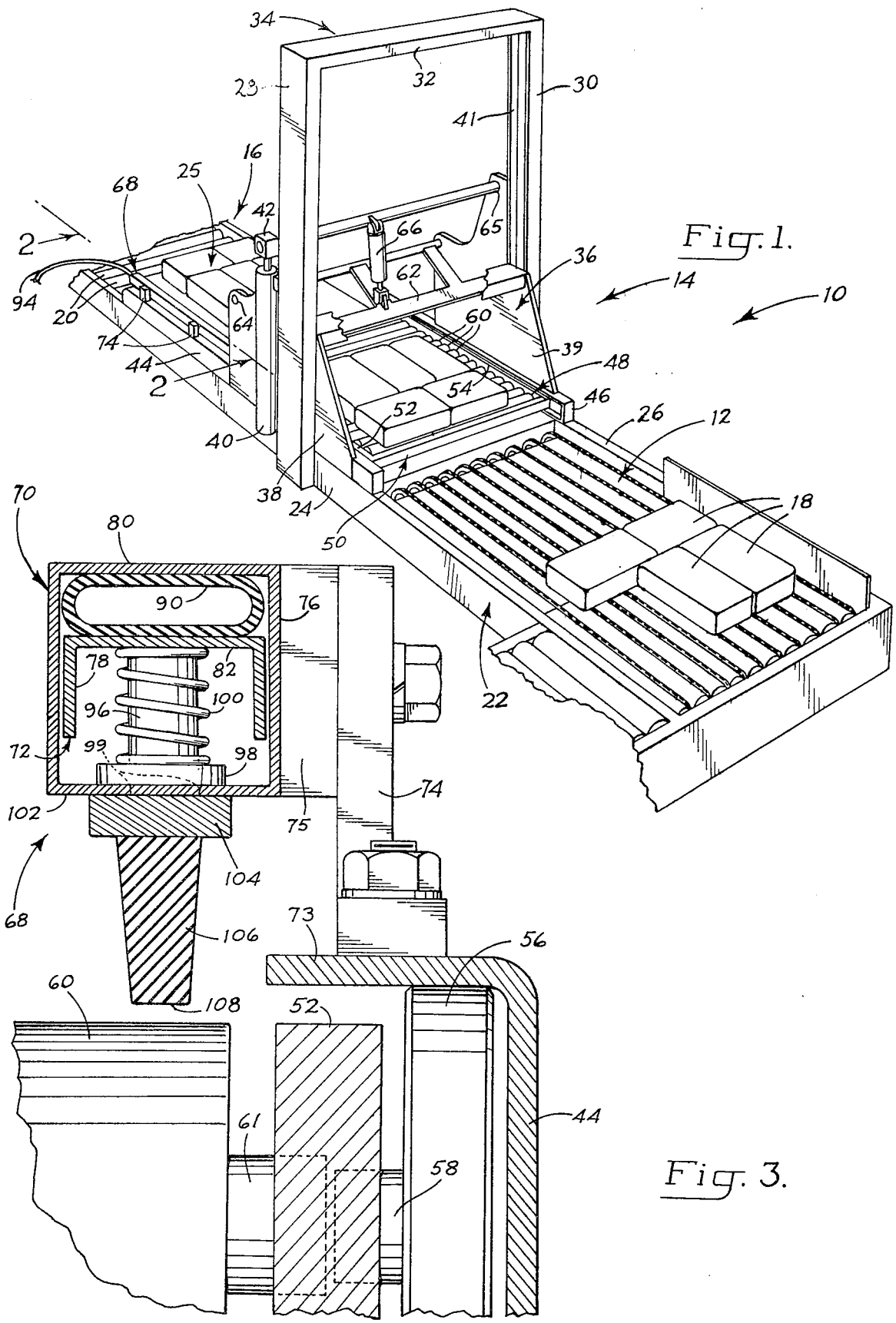
FIG. 1 is a perspective view of a portion of a palletizer employing the roller-assisted off-feed device of the present invention.

Referring first to FIG. 1, there is shown generally at 10 a bag palletizer equipped with a roller-assisted off-feed device constructed according to the present invention. In broad terms, the bag palletizer includes a layer-arranging table 12, an article stacking, or article-transfer, section 14 and an article-receiving section, or stacking platform 16. Non-rigid articles, such as bags 18, are arranged on table 12 in a layer having a desired configuration. From there they are transferred to section 14. From section 14, the articles are off-loaded onto stacking platform 16 in a manner to be described.

Figure 4:
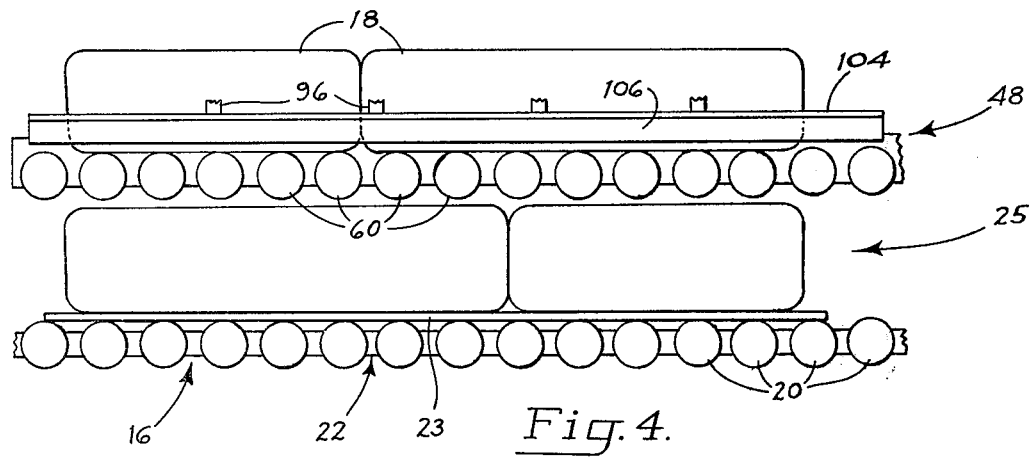
FIGS. 4 and 5 illustrate, in diagramatic side view, sequential steps in the off-loading of articles from the roller carriage.
Figure 5:
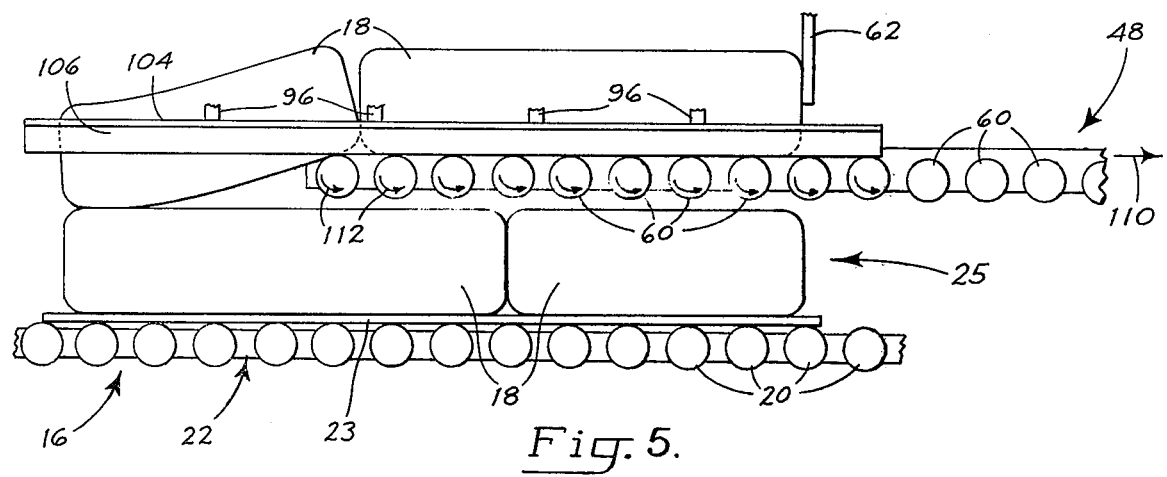

With additional reference to FIGS. 4 and 5, the surface of stacking platform 16 is formed of a plurality of horizontally-extending rollers 20 mounted on a supporting frame 22. Rollers 20 support a pallet 23 upon which article layers, such as layer 25, are stacked in multi-tier fashion.

Other features of layer-arranging table 12, article-transfer section 14 and stacking platform 16 have been detailed previously in U.S. Pat. No. 4,067,456. Therefore, only those portions of the bag palletizer which are related to the operation of the roller-assisted off-feed device of the present invention will be herein described. The reader is referred to the above-cited patent for a more complete description of the bag palletizer.

With reference to FIG. 1, palletizer supporting frame 22 includes a pair of laterally-spaced, substantially parallel side rails 24, 26. Mounted on frame 22, downstream of the layer-arranging table, are a pair of upright, laterally-spaced channeled columns 28, 30, laterally joined at their upper ends by a crosspiece 32. These columns and crosspiece form a substantially upright frame 34. A carriage assembly, indicated at 36, includes a pair of laterally-spaced side plates 38, 39 having guide means thereon (not shown) which ride within opposed column channels, such as channel 41, for vertical shifting therealong. Disposed outwardly of plates 38, 39 are a pair of elongate, upright, double-acting fluid-operated rams, such as ram 40. These rams are secured at their cylinder ends to the supporting frame and are directly connected at their rod ends to plates 38, 39 through journal connectors, such as connector 42. Such direct connection between the ram and carriage assembly permits the assembly to be raised or lowered at the same speed at which the rams extend and retract.

Mounted along the lower edges of plates 38, 39, and cantilevered therefrom in the downstream direction are horizontally-disposed, substantially parallel guide arms, or tracks 44, 46, respectively. A roller carriage 48 is mounted for horizontal shifting along tracks 44, 46 between an extended position wherein the carriage overlies the stacking platform (FIG. 4), and a retracted position wherein the carriage is spaced upstream of the stacking platform, as seen in FIG. 1. Carriage 48 includes a rectangular frame 50 having a pair of laterally-spaced, parallel side members 52, 54 extending longitudinally, and within the channeled regions of tracks 44, 46, respectively, as seen in FIG. 3. Members 52, 54 are supported in tracks 44, 46, respectively, for movement therealong by plural rollers, such as roller 56 (see FIG. 3), journaled to members 52, 54 by axles, such as axle 58, extending outwardly therefrom. Carriage 48 is shifted between its extended and retracted positions by a pair of double-acting rams (not shown) which are positioned adjacent and substantially parallel to tracks 44, 46. These rams are connected at their cylinder ends to tracks 44, 46 and at their rod ends to frame 50.

The upper surface of carriage 48 is formed of a plurality of article-support rollers 60 mounted for rotation about horizontal axes extending transversely of the path traveled by the carriage. As seen in FIG. 3, rollers 60 are rotatably journaled to opposed members 52, 54 through shafts, such as shaft 61, attached to opposed ends of the rollers.

Extending between side plates 38, 39 on carriage assembly 36 is an elongate fence 62, journaled to plates 38, 39 at 64, 65, respectively, for pivoting about an axis extending through the journal connections. The fence is shiftable between a raised, inoperative position, shown in FIG. 1, and a lowered, substantially upright operative position, shown fragmentarily in FIG. 5 wherein the lower edge margin of the fence is vertically adjacent the plane occupied by carriage rollers 60. An elongate, double-acting ram 66 operatively interconnects side-plates 38, 39 and fence 62, such that retraction of the ram swings the fence to its raised, inoperative position, and extension of the ram lowers the fence to its operative position. Fence 62 is also referred to herebelow as fence means.

Figure 2:
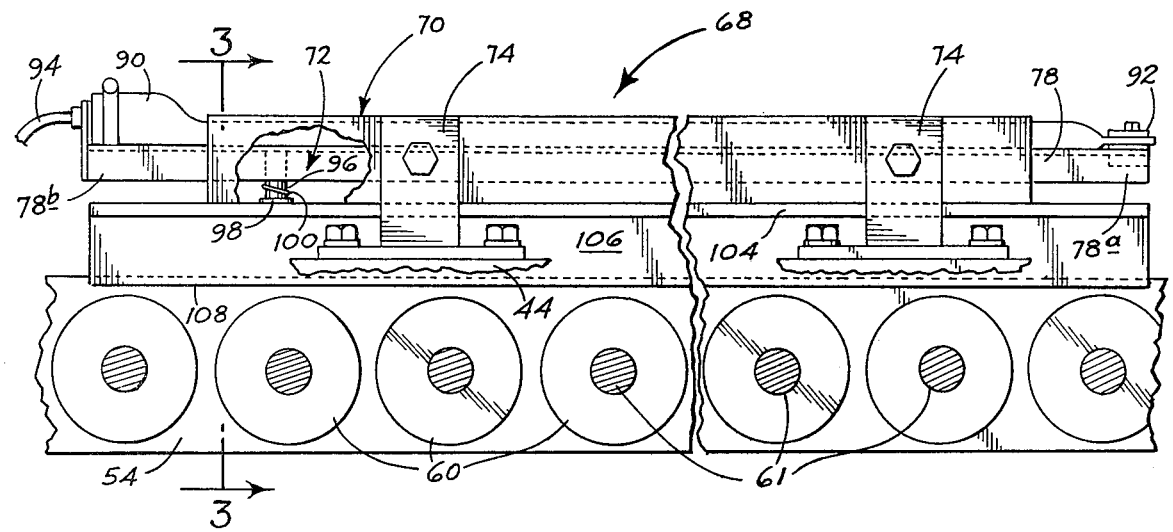
FIG. 2 is an enlarged, sectional view of the device and a portion of the palletizer carriage, with sections broken away, taken generally along line 2—2 in FIG. 1, but showing the roller carriage in its extended position.

With particular reference to FIGS. 2 and 3, there is shown generally at 68 a roller contact assembly constructed according to a preferred embodiment of the present invention. Assembly 68 generally includes a first member, or housing 70 and a second member 72 vertically shiftable relative thereto. Housing 70 is an elongate square tube extending along the downstream end of track 44. The housing is mounted to the upper surface 73 of track 44 by mounting brackets 74, which are threadably attached to the side 76 of housing 70 through a spacer 75 (FIG. 3).

Member 72 includes an elongate channel bar 78 extending through housing 70 and projecting at its upstream and downstream ends 78a, 78b, respectively, outwardly therefrom (FIG. 2). Pressure responsive means, generally including an elongate inflatable/deflatable hose 90, is positioned between the upper side 80 of housing 70 and the upper side 82 of bar 78, being secured to bar 78 at the latter's upstream and downstream ends 78a, 78b. Hose 90 is closed at its upstream end, for example by a plate 92 used in securing the hose to the bar. At its downstream end, hose 90 is connected in fluid communicaton with an air supply hose 94 through which air may be supplied to, and removed from, hose 90, to inflate or deflate the same, respectively. It can be appreciated, with reference to FIG. 3, that as hose 90 is deflated (as shown in FIGS. 2, 3) and inflated, second member 72 shifts toward and away from the upper portion of first member 70, respectively.

Member 72 is mounted on housing 70 for shifting relative thereto by a plurality of laterally-spaced rods, such as rod 96, which are attached at their upper ends to side 82 of bar 78. The lower portion of each rod 96 extends through a washer 98 and an opening 99 formed in the lower side 102 of housing 70. Encircling rod 96 in the region between washer 98 and side 82 of bar 78 is biasing means generally including a compression spring 100. It can be appreciated from FIG. 3 that with hose 90 deflated, as shown, spring 100 serves to bias bar 78 upwardly against the hose, thereby retaining member 72 at a first, or raised, position. When hose 90 is inflated, member 72 shifts downwardly against the force of spring 100, to a second, or lowered position. Upon deflation of hose 90, the compressed spring returns member 72 toward its raised position.

With continued reference to FIGS. 2 and 3, a mounting pad 104 extending substantially coextensive with bar 78 is attached to the lower ends of rods 96 where the rods project through openings 99 in housing 70. As best seen in FIG. 3, pad 104 abuts side 102 of housing 70 when member 72 is in its raised position. Contacting means generally including an elongate element, or finger, 106 is attached to the lower surface of pad 104. Finger 106 is formed of a compressible material, such as rubber, having a frictional surface 108 frictionally engageable with rollers 106 when member 72 is shifted to its lowered position, as will be described. Finger 106 may be a single elongate finger, or may include a plurality of aligned fingers having longitudinally-spaced gaps therebetween. As member 72 is shifted between its first and second positions, element 106 is carried between corresponding first, or raised, and second or lowered, positions. Thus, positioning means for selectively shifting element 106 between its first and second positions includes housing 70 and member 72 vertically shiftable therein, spring 100 yieldably biasing member 72 toward the upper portion of member 70, and hose 90 for selectively shifting member 72 away from such upper portion.

Describing now the operation of the present invention, non-rigid articles, such as bags 18, are arranged on layer-arranging table 12, and from there, moved downstream onto carriage 48, with the carriage assembly in a lowered position, shown in FIG. 1. The above-described arranging and transferring operations are performed substantially in the manner described in U.S. Pat. No. 4,067,456.

To stack the article layer on carriage 48 onto layer 25, carriage assembly is raised, by activating rams 40, to a height at which the lower surface of carriage 48 can pass over layer 25 when the carriage is shifted to its extended position, as seen in FIG. 4. As the carriage is extended, element 106 is in first position, shown in FIGS. 2-4, wherein its lower surface 108 is spaced above the upper surfaces of rollers 60, as the same move downstream. During such downstream shifting of the carriage, rollers 60 are stationary relative to the carriage. When the carriage has been shifted to its extended position, hose 90 is inflated, by introducing air through supply hose 94, causing member 72 and attached element 106 to shift downwardly to the lowered position wherein element surface 108 contacts the upper surfaces of rollers 60.

Concomitantly, fence 62 is shifted, by activation of ram 66, to its upright position, wherein the fence is vertically aligned with the upstream end of articles 18 in layer 25, as seen in FIG. 5. The off-loading of articles from the carriage onto the stacking platform is accomplished by shifting the carriage from its extended position, toward its retracted position, as indicated in FIG. 5. During such shifting, element 106 is maintained in its lowered position by continued supply of air to hose 90. With reference to FIG. 5, it can be appreciated that as the carriage is shifted upstream in the direction of arrow 110, frictional contact between element 106 and rollers 60, which substantially prevents free rotation thereof, causes the rollers to rotate in a counterclockwise direction, as indicated by arrows 112, with the surface velocity of the rollers equaling the linear velocity of the carriage. This rotation of the rollers serves to transfer the articles at a speed substantially equal to, and in a direction opposite that of, the movement of the carriage. As a result, the articles on carriage 48 are maintained at a relatively fixed position relative to the stacking platform as the carriage is shifted upstream, and are off-loaded therefrom as the carriage moves upstream. Fence 62, rather than functioning to wipe articles off the carriage, as in the prior art, now functions primarily to maintain the upstream edges of articles on carriage 48 vertically aligned with the upstream edges of articles on the stacking platform, as they are off-loaded from the carriage.

When the carriage has returned to its retracted position, hose 90 is deflated by exhaust of air through supply hose 94, whereupon spring 100 returns member 72 and attached element 106 to the raised position, illustrated in FIG. 3. The carriage, once lowered to its position horizontally adjacent table 12, is ready to accept a new row of articles thereon. The above sequence is repeated until a desired number of article layers is stacked on the pallet.

A roller-assisted off-feed device for use with a palletizer for assisting off-loading of articles from the palletizer carriage onto a stacking platform, has thus been disclosed. It is recognized that various changes and modifications in the above-described embodiment may be made without departing from the spirit of the invention.

It is claimed and desired to secure by Letters Patent:

1. Apparatus for stacking articles on a stacking platform comprising
    a carriage mounted for horizontal shifting between an extended position overlying said stacking platform and a retracted position spaced from said platform, said carriage including a plurality of article-support rollers mounted for rotation about substantially horizontal axes extending transversely of the path traveled by said carriage as it moves from its extended to its retracted position,
    first and second elongate members disposed along the path of travel of said carriage above said stacking platform, and mounted for relative shifting toward and away from one another, to effect shifting of the second member between first and second positions, respectively,
    biasing means yieldably biasing said first and second members toward one another,
    an inflatable/deflatable hose operatively interposed between said first and second members to shift said members apart upon inflation of said hose, and
    an elongate element mounted on said second member and extending horizontally along the path of travel of said carriage, said element having a frictional surface positioned to engage said rollers when said second member is shifted to its second position, causing the rollers to rotate to off-load articles from the carriage as the carriage is moved from its extended to its retracted position.

2. Apparatus for stacking articles on a stacking platform comprising
    a carriage mounted for horizontal shifting between an extended position overlying said stacking platform and a retracted position spaced from said platform, said carriage including a plurality of article-support rollers mounted for rotation about substantially horizontal axes extending transversely of the path traveled by said carriage as it moves from its extended to its retracted position,
    first and second elongate members disposed along the path of travel of said carriage above said stacking platform, and mounted for relative shifting toward and away from one another, to effect shifting of the second member between first and second positions, respectively,
    biasing means yieldably biasing said first and second members toward one another,
    an inflatable/deflatable element operatively interposed between said first and second members to shift said members apart upon inflation of said element,
    a third elongate member mounted on said second member and extending horizontally adjacent the path of travel of said carriage, said third member having a frictional surface positioned to engage said rollers when said second member is shifted to its second position, causing the rollers to rotate to off-load articles from the carriage as the carriage is moved from its extended toward its retracted position, and
    fence means shiftable toward and away from a position adjacent said stacking platform, for resisting, when in such position, lateral movement of articles during off-load.

* * * * *